United States Patent
Chetry et al.

(10) Patent No.: US 10,037,770 B1
(45) Date of Patent: Jul. 31, 2018

(54) METHOD FOR PROVIDING A MAGNETIC RECORDING WRITE APPARATUS HAVING A SEAMLESS POLE

(71) Applicant: Western Digital (Fremont), LLC, Fremont, CA (US)

(72) Inventors: Krishna Bahadur Chetry, Fremont, CA (US); Ming Sun, San Jose, CA (US); Jinqiu Zhang, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 284 days.

(21) Appl. No.: 14/939,934

(22) Filed: Nov. 12, 2015

(51) Int. Cl.
| | | |
|---|---|---|
| *G11B 5/127* | (2006.01) | |
| *G11B 5/17* | (2006.01) | |
| *G11B 5/31* | (2006.01) | |

(52) U.S. Cl.
CPC .............. *G11B 5/1272* (2013.01); *G11B 5/17* (2013.01); *G11B 5/3163* (2013.01); *Y10T 29/4906* (2015.01); *Y10T 29/49021* (2015.01); *Y10T 29/49032* (2015.01)

(58) Field of Classification Search
CPC ......... Y10T 29/49021; Y10T 29/49032; Y10T 29/49048; Y10T 29/49052; Y10T 29/4906; Y10T 29/49064; Y10T 29/49066; G11B 5/1272; G11B 5/17; G11B 5/3103; G11B 5/3106; G11B 5/3116; G11B 5/313; G11B 5/3163
See application file for complete search history.

(56) References Cited

U.S. PATENT DOCUMENTS

| | | |
|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |

(Continued)

OTHER PUBLICATIONS

Wanxue Zeng, et al., U.S. Appl. No. 14/187,726, filed Feb. 24, 2014, 29 pages.

*Primary Examiner* — Peter DungBa Vo
*Assistant Examiner* — Joshua D Anderson
(74) *Attorney, Agent, or Firm* — Foley & Lardner LLP (57) ABSTRACT

A method provides a magnetic write apparatus. The method includes providing a pole including a pole tip, a yoke, a pole bottom and a pole top. The pole is seam free and formed vertically in a direction from the pole bottom toward the pole top. At least one coil for energizing the pole is also provided. In some aspects, providing the pole may include removing a portion of an intermediate layer to form a trench therein. The trench has a shape and location corresponding to the pole, a bottom, a top and sides. A conductive layer is deposited in the trench and on a top surface of the intermediate layer. Insulating layer(s) are provided on the sides of the trench. Only part of the conductive layer on the trench bottom is exposed. Pole material(s) are grown on the exposed portion of the conductive layer to provide the pole.

20 Claims, 9 Drawing Sheets

(56) References Cited

U.S. PATENT DOCUMENTS

| | | |
|---|---|---|
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |

(56) References Cited

U.S. PATENT DOCUMENTS

| | | |
|---|---|---|
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,751,846 B2 | 6/2004 | Hashimoto et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,877,213 B2 * | 4/2005 | Zolla .................... G11B 5/3116 205/211 |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,897,148 B2 * | 5/2005 | Halahan ............ H01L 21/76843 257/E21.597 |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,946,716 B2 | 9/2005 | Andricacos et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,293,345 B2 | 11/2007 | Matono et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |

(56) References Cited

U.S. PATENT DOCUMENTS

| | | |
|---|---|---|
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |

(56) References Cited

U.S. PATENT DOCUMENTS

| | | |
|---|---|---|
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0243306 A1* | 8/2015 | Wu .................. G11B 5/3163 360/236.8 |

\* cited by examiner

Prior Art
ABS View
FIG. 1A

Yoke View
Prior Art
FIG. 1B

ABS View
FIG. 4A

Yoke View
FIG. 4B

ABS View
FIG. 8A

Yoke View
FIG. 8B

Plan View
FIG. 8C

ABS View
FIG. 9A

Yoke View
FIG. 9B

ABS View
FIG. 10A

Yoke View
FIG. 10B

Plan View
FIG. 10C

ABS View
FIG. 11A

Yoke View
FIG. 11B

Plan View
FIG. 11C

ABS View
FIG. 12A

Yoke View
FIG. 12B

Plan View
FIG. 12C

ABS View
FIG. 13A

Yoke View
FIG. 13B

Plan View
FIG. 13C

METHOD FOR PROVIDING A MAGNETIC RECORDING WRITE APPARATUS HAVING A SEAMLESS POLE

BACKGROUND

Figure 1A:
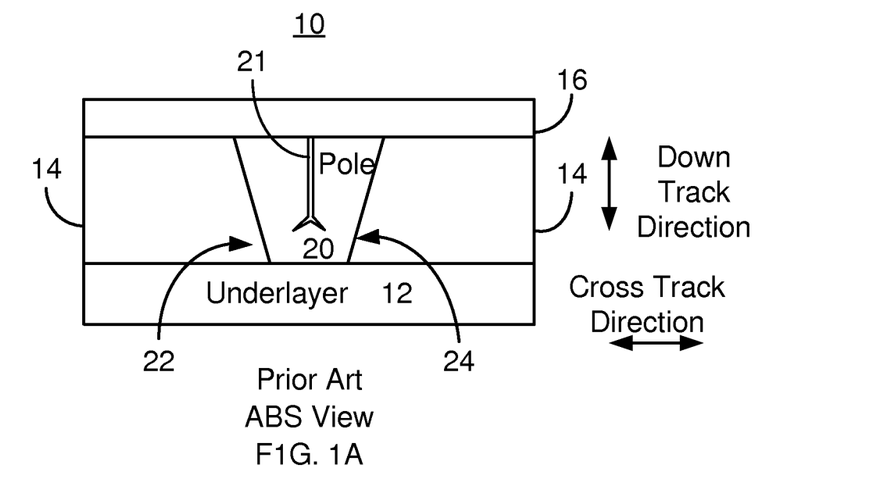
FIGS. 1A-1B depict ABS and yoke view of a conventional magnetic recording head.
Figure 1B:
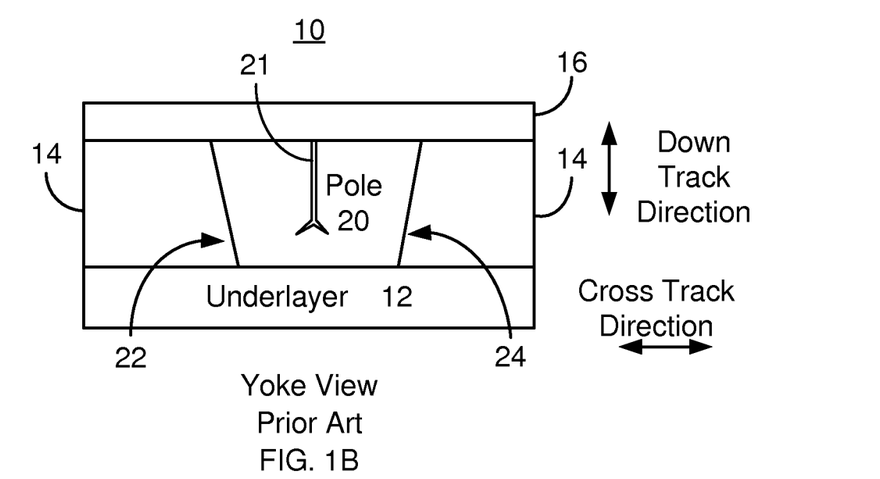

FIGS. 1A and 1B depict air-bearing surface (ABS) and yoke views of a conventional magnetic recording apparatus 10. The magnetic recording apparatus 10 includes a main pole 20, intermediate layer 14, and top gap 16. The main pole 20 resides on the underlayer 12 and includes sidewalls 22 and 24. Below the underlayer 12 may be a leading shield. As can be seen in FIGS. 1A and 1B, portions of the main pole 20 recessed from the ABS in the stripe height direction are wider in the cross track direction than at the ABS.

In order to form the pole 20, a trench is provided in the intermediate layer 14. The magnetic material for the pole 20 is typically grown in the trench. Because the growth may be substantially conformal, the material(s) for the pole may grow in from the sides and bottom of the trench. Where the materials meet, a seam 21 may be formed. In some cases, the seam 21 may be approximately two nanometers wide.

Although the conventional magnetic recording head 10 functions, there are drawbacks. In particular, the conventional magnetic recording head 10 may not perform sufficiently at higher recording densities. The seam 21 may be viewed as analogous to defects in the magnetic material(s) forming the pole 20. The seam 21 thus has a lower magnetic moment than remaining portions of the pole 20. Although the seam 21 is not very wide, at higher recording densities, the seam 21 occupies a larger fraction of the pole 20. Stated differently, the width of the pole 20 shrinks for higher recording densities, but the width of the seam 21 may stay substantially the same. As a result, the magnetization of and magnetic field output by the pole 20 may decrease. Performance of the pole 20 at higher recording densities may, therefore, suffer. Accordingly, what is needed is a system and method for improving the performance of a magnetic recording head.

BRIEF DESCRIPTION OF SEVERAL VIEWS OF THE DRAWINGS

FIGS. 10A, 10B and 10C through 13A, 13B and 13C depict ABS, yoke and plan views of an exemplary embodiment of a magnetic write apparatus during fabrication.

DETAILED DESCRIPTION OF THE PREFERRED EMBODIMENTS

While the various embodiments disclosed are applicable to a variety of data storage devices such as magnetic recording disk drives, solid-state hybrid disk drives, networked storage systems and/or other data storage devices, for the sake of illustration the description below uses disk drives as examples.

Figure 2:
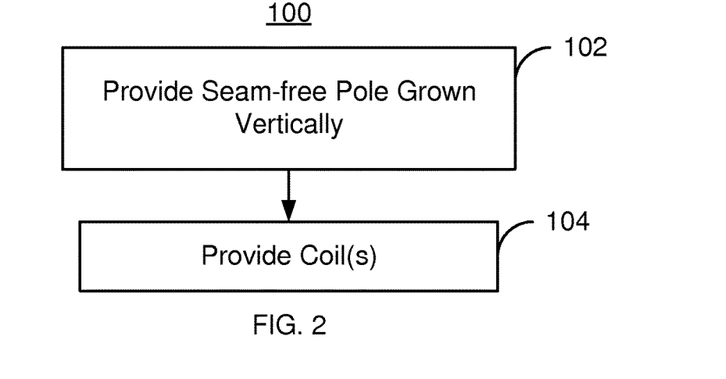
FIG. 2 depicts a flow chart of an exemplary embodiment of a method for fabricating a portion of a magnetic recording write apparatus.

FIG. 2 depicts an exemplary embodiment of a method 100 for providing a magnetic write apparatus. For simplicity, some steps may be broken into substeps, omitted, interleaved, and/or combined. The method 100 is also described in the context of providing a single magnetic write apparatus that may be used in a magnetic recording disk drive or other data storage device. However, the method 100 may be used to fabricate multiple magnetic write apparatuses at substantially the same time. The method 100 is also described in the context of particular layers. A particular layer may include multiple materials and/or multiple sub-layers. The method 100 also may start after formation of other portions of the magnetic recording apparatus. For example, the method 100 may start after a read apparatus, return pole/shield and/or other structures have been fabricated.

A seam-free pole is provided, via step 102. Step 102 includes providing a pole including a pole tip region and a yoke region wider than the pole tip region. The pole also has a pole bottom and a pole top. The pole tip region is between the yoke region and the ABS. Further, a portion of the pole tip region may occupy part of the ABS. In some embodiments, step 102 is performed such that the top of the pole tip is wider than the bottom. The yoke may also have its top wider than its bottom. In addition, step 102 is performed such that the pole is seam free. In some embodiments, this corresponds to depositing/growing the material(s) for the main pole vertically, in a direction from the pole bottom toward the pole top. For example, the pole may be plated from the bottom to the top. Thus, the pole formed in step 102 is seam free.

Step 102 may include using one or more damascene processes. For example, a trench may be formed in an intermediate layer. In some embodiments, the intermediate layer may be insulating. In other embodiments the trench may be formed in another layer, including but not limited to a shield layer. The trench may be fabricated such that portions of the trench sidewalls form angles that are analogous to those of the main pole. Once the trench has been formed, a seed layer may be provided. A portion of the seed layer in the trench may be covered by one or more insulating layers. The pole material(s) may then be provided on an exposed portion of the seed layer as part of step 102. The exposed portion of the seed layer is in the bottom of the trench. The pole materials thus grow from the bottom of the trench upward in all portions of the trench. Eventually the trench is filled. Thus, both the pole tip region and the yoke region of the pole are seam-free. In other embodiments, other methods might be used to fabricate the seam-free pole.

The coil(s) are provided, via step 104. Portions of step 104 may be interleaved with the remaining steps of the method 100. For example, portions of the coil may be provided before the formation of the pole. However, other portions of the coil may be provided after some or all of the main pole has been formed. Step 104 may also include depositing and patterning the material(s) used for the coil(s). Step 104 may include forming a helical coil or one or more pancake/spiral coils. In such embodiments, a spiral coil may include other turns far from the ABS.

Using the method 100, performance of the pole may be enhanced. The pole is substantially free of seams. The pole materials grow vertically from the bottom up in step 102. In regions in which the pole is grown in this manner, a seam is not formed. At least a portion of the pole, and in some embodiments all of the pole, may thus be seam free. The defects associated with the seam are, therefore, not present in the pole. Consequently, the pole formed using the method 100 may provide a higher magnetic field. Performance of the pole and magnetic write apparatus may thus be improved. This improvement may be particularly beneficial at higher recording densities where a seam might occupy a significant portion of the pole tip.

Figure 3:
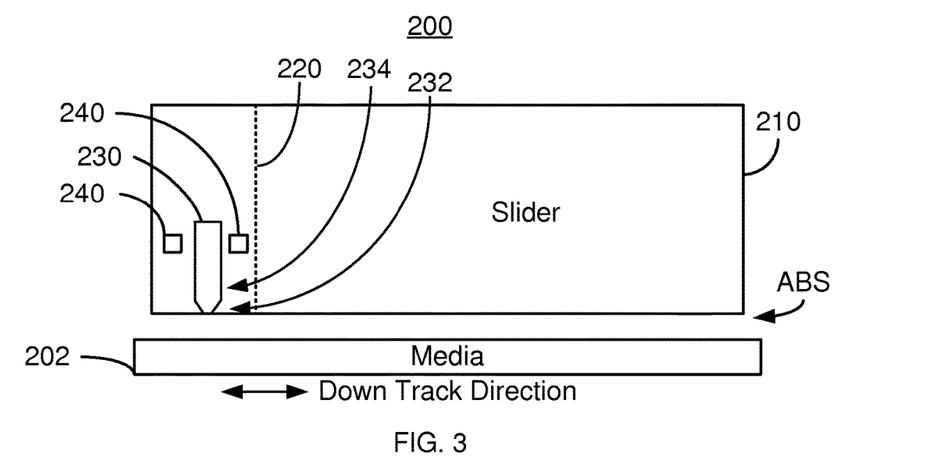
FIG. 3 depicts an exemplary embodiment of a magnetic recording disk drive.
Figure 4A:
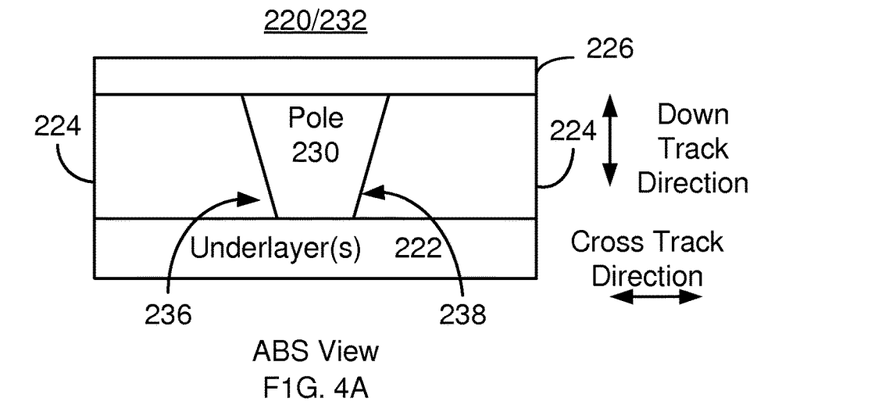
FIGS. 4A and 4B depict ABS and yoke views of an exemplary embodiment of a magnetic write apparatus.
Figure 4B:
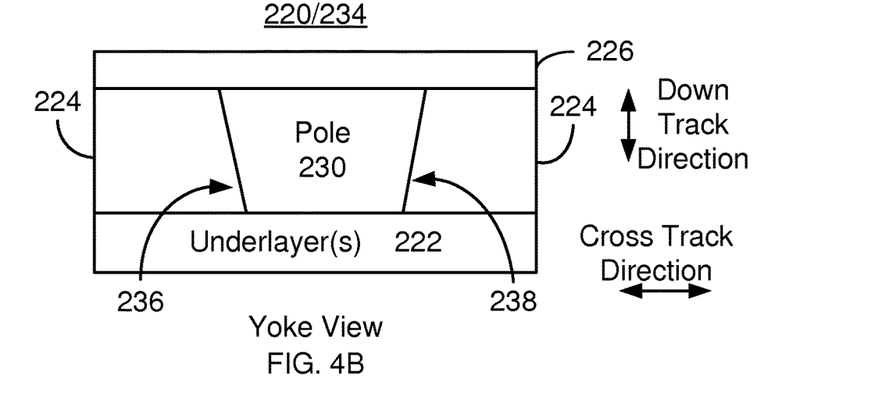

FIG. 3 depicts a side view of an exemplary embodiment of a portion of a disk drive 200 including a write apparatus 220 and which may be fabricated using the method 100. FIGS. 4A and 4B depict ABS and yoke views of the write apparatus 220. For clarity, FIGS. 3, 4A and 4B are not to scale. For simplicity not all portions of the disk drive 200 and write apparatus 220 are shown. In addition, although the disk drive 200 and write apparatus 220 are depicted in the context of particular components other and/or different components may be used. For example, circuitry used to drive and control various portions of the disk drive 200 is not shown. For simplicity, only single components 202, 210, 220, 230 and 240 are shown. However, multiples of each components 202, 210, 220, 230 and 240 and/or and their sub-components, might be used. The disk drive 200 may be a perpendicular magnetic recording (PMR) disk drive. However, in other embodiments, the disk drive 200 may be configured for other types of magnetic recording. In other embodiments, the pole formed using the method 100 may be in other data storage device(s)

The disk drive 200 includes media 202, a slider 210 and a write apparatus 220. Additional and/or different components may be included in the disk drive 200. Although not shown, the slider 210 and thus the write apparatus 220 are generally attached to a suspension (not shown). The write apparatus 220 is fabricated on the slider 210 and includes a media-facing surface. In the embodiment shown, the media-facing surface is an air-bearing surface (ABS) that is proximate to the media 202 during use. In general, the disk drive 200 includes the write apparatus 220 and a read apparatus. However, for clarity, only the write apparatus 220 is shown. The write apparatus 220 includes a main, or write, pole 230, intermediate layer 224, top tap 226, and coils 240. The main pole 230 resides on underlayer 222. Different and/or additional components may be used in the write apparatus 220.

The coil(s) 240 are used to energize the pole 230. Two turns 240 are depicted in FIG. 3. Another number of turns may, however, be used. Note that only a portion of the coil(s) 240 is shown in FIG. 3. If, for example, the coil(s) 240 form a helical coil, then additional portion(s) of the coil(s) 240 may be located on the opposite side of the main pole 230 as is shown. If the coil(s) 240 is a spiral coil, then additional portions of the coil(s) 240 may be located further from the ABS. Further, additional coils may also be used.

The pole 230 includes a pole tip region 232 close to the ABS and a yoke region 234 recessed from the ABS. The yoke region shown in FIG. 4B and the pole tip region shown in FIG. 4A are both free of seams. This is in contrast to the conventional pole depicted in FIGS. 1A and 1B, which may have a seam 21 in both the yoke and pole tip regions. The pole tip region 232 is shown as having top and bottom bevels, near the ABS. Thus, the height of the pole 230 (distance along the down track direction) changes in the yoke direction perpendicular to the ABS. Further, the yoke region 234 may be wider (distance in the cross-track direction/out of the plane of the page in FIG. 3) than the pole tip region 232. In addition, the pole 230 includes sidewalls 236 and 238 in the cross track direction. The sidewalls may be configured such that the pole 230 has a bottom and a top wider than the bottom. The sidewalls 236 and 238 form sidewall angles with the down track direction. In some embodiments, the sidewalls 236 and 238 are symmetric.

The magnetic disk drive 200 may exhibit improved performance. The pole 230 may be substantially free of seams in both the pole tip region 232 and the yoke region 234. Consequently, the pole tip 230 may be free of defects that would otherwise deplete the magnetization. Consequently, the pole 230 may provide a higher magnetic field. Performance of the pole 230, magnetic write apparatus 220 and disk drive 200 may thus be improved. This improvement may be particularly beneficial at higher recording densities where a seam might occupy a significant portion of the pole tip 232.

Figure 5:
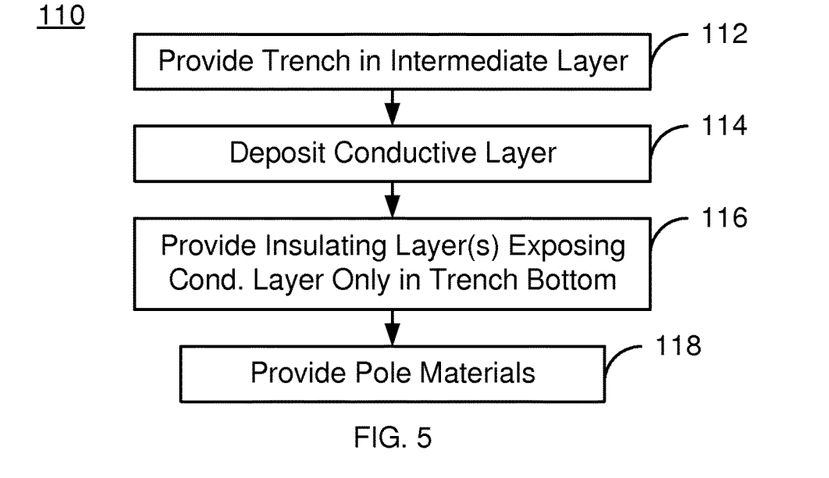
FIG. 5 depicts a flow chart of an exemplary embodiment of a method for fabricating a pole for a magnetic write apparatus.

FIG. 5 depicts an exemplary embodiment of a method 110 for providing a pole for a magnetic write apparatus. For simplicity, some steps may be broken into substeps, omitted, interleaved, and/or combined. The method 110 is also described in the context of providing a single pole for a magnetic write apparatus, such as a writer in a disk drive. However, the method 110 may be used to fabricate multiple poles and/or multiple magnetic write apparatuses at substantially the same time. Further, the method 110 may be used to manufacture other magnetic write apparatuses used in other data storage devices. The method 110 is also described in the context of particular layers. A particular layer may include multiple materials and/or multiple sub-layers. The method 110 also may start after formation of other portions of the magnetic write apparatus. For example, the method 110 may start after a read apparatus, return pole/shield and/or other structures have been fabricated. The method 110 also starts after an intermediate layer has been provided. In some embodiments, the intermediate layer is an insulator, such as aluminum oxide. In other embodiments, the intermediate layer may be other nonmagnetic material(s).

A trench is formed in the intermediate layer, via step 112. Step 112 may include providing on the intermediate layer a mask having an aperture therein. The portion of the intermediate layer exposed by the aperture is removed. The trench may have the desired location and profile for pole to be fabricated. Thus, the top of the trench may be wider than the bottom of the trench.

Once the trench has been formed, a conductive layer is deposited in the trench and on a top surface of a remaining portion of the intermediate layer, via step 114. The conductive layer is generally desired to be nonmagnetic. The conductive layer may be a seed layer, such as Ru. Step 114 may be carried out by chemical vapor deposition (CVD).

At least one insulating layer is provided on the sides of the trench, via step 116. As a result, only a portion of the conductive layer on the bottom of the trench is exposed. Step 116 may be carried out by depositing an insulating layer only on the sides of the trench. In some embodiments, the insulating layer may also be on the top surface of the intermediate layer. In other embodiments, multiple insulating layers are used. One insulating layer may be used to cover the sides of the trench while another insulating layer may be cover the top surface of the intermediate layer. For example, one insulating layer may be blanket deposited and a portion of the insulator removed. The portion of the insulating layer at the bottom of the trench may be removed. In addition, the insulating layer may be removed on the top surface of the intermediate layer. A second insulating layer may be deposited. This insulating layer may over only the top surface or may also cover other portions of the write apparatus. Alternatively, an insulating layer may be blanket deposited then removed only from the bottom of the trench. As a result, the conductive layer may be covered by an insulator except at the trench bottom.

The pole materials may then be provided, via step 118. In step 118, the pole materials are provided such that they are only grown on the exposed conductive layer. As a result, the pole materials grow up from the bottom of the trench. In some embodiments, step 118 includes electroplating CoFe and/or other high saturation magnetization material(s). Thus, the pole may be formed.

Using the method 110, performance of the pole may be enhanced. The pole may be substantially free of seams. Because of the manner in which the pole materials may grow (vertically from the bottom up) in regions in which the pole is grown, a seam is not formed. At least a portion of the pole, and in some embodiments all of the pole, may thus be seam free. Consequently, the pole formed using the method 100 may provide a higher magnetic field. Performance of the pole and magnetic write apparatus may thus be improved. This improvement may be particularly beneficial at higher recording densities where a seam might occupy a significant portion of the pole tip.

Figure 6:
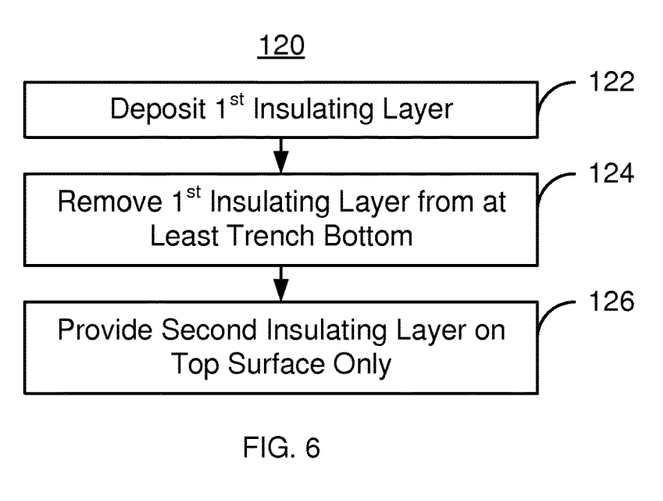
FIG. 6 depicts a flow chart of an exemplary embodiment of a method for providing an insulator during fabrication of a pole for a magnetic write apparatus.

FIG. 6 depicts an exemplary embodiment of a method 120 for providing the insulating layer of the methods 100 and 110. For simplicity, some steps may be broken into substeps, omitted, interleaved, and/or combined. The method 120 is also described in the context of providing a single pole for a magnetic write apparatus, such as a writer in a disk drive. However, the method 120 may be used to fabricate multiple poles and/or multiple magnetic write apparatuses at substantially the same time. Further, the method 120 may be used to manufacture other magnetic write apparatuses used in other data storage devices. The method 120 is also described in the context of particular layers. A particular layer may include multiple materials and/or multiple sub-layers. The method 120 also starts after the trench formed in step 112 of the method 110 has been formed and the conductive layer deposited.

A first insulating layer is deposited, via step 122. Step 122 may include depositing a layer of at least one of aluminum oxide, silicon oxide and silicon nitride. The insulating layer may be conformally deposited in step 122. For example, atomic layer deposition (ALD) may be used. However, another deposition method might be employed in another embodiment. The layer deposited may be at least 1.5 nanometer thick. In other embodiments, the insulating layer may have another thickness. The insulating layer provided in step 122 is desired to be sufficiently thick to electrically isolate subsequent layer(s) from the underlying conductive layer.

A portion of the first insulating layer is removed, via step 124. At least the part of the insulating layer that is on the bottom of the trench is removed in step 124. In some embodiments, the insulating layer is also removed from the top of the intermediate layer. Thus, step 124 may employ an anisotropic etch, such as an anisotropic reactive ion etch (RIE). Such an RIE may remove material in a direction perpendicular to the top surface of the intermediate layer and, therefore, perpendicular to the bottom of the trench. Thus, the conductive layer on the bottom of the trench and on the top surface of the intermediate layer might be exposed.

A second insulating layer is provided, via step 126. The second insulating layer may also include aluminum oxide, silicon oxide or silicon nitride. In some embodiments, the same material is used in step 122 as in step 126. In alternate embodiments, different materials might be used. The second insulating layer is deposited in step 126 such that it does not reside on the bottom of the trench. For example, the second insulating layer may be provided only on the top of the intermediate layer. In other embodiments, some portion of the second insulating layer may also be on the sidewalls of the trench. However, the bottom of the trench remains substantially free of insulator such that the conductive layer is exposed. In some embodiments, step 126 is performed via ion beam deposition at a low deposition angle from the top surface of the intermediate layer. The specific deposition angle used may depend upon the width of the trench in the yoke and pole tip regions. In some embodiments, the second insulating layer is deposited at a deposition angle of not more than ten degrees from the top surface of the remaining portion of the intermediate layer. In some embodiments, the angle is greater than zero degrees and does not exceed five degrees. Use of a shallow angle may allow for the second insulating layer to be provided outside of the trench bottom. The thickness of the insulating layer(s) on the trench sidewalls and top surface of the intermediate layer is sufficient to provide electrical isolation. Thus, pole materials may not be grown on the insulating layer(s) provided in the method 120.

Using the method 120 in conjunction with the methods 100 and/or 110 allows the conductive layer to be exposed only on the bottom of the trench. The trench sidewalls and top of the intermediate layer are electrically insulated. Thus, pole materials may not be plated on these surfaces. As a result, the pole can be grown from the bottom of the trench/pole to the top. The seam-free pole of the methods 100 and 110 may then be provided. Performance of a magnetic write apparatus fabricated using the method 120 may thus be improved.

Figure 7:
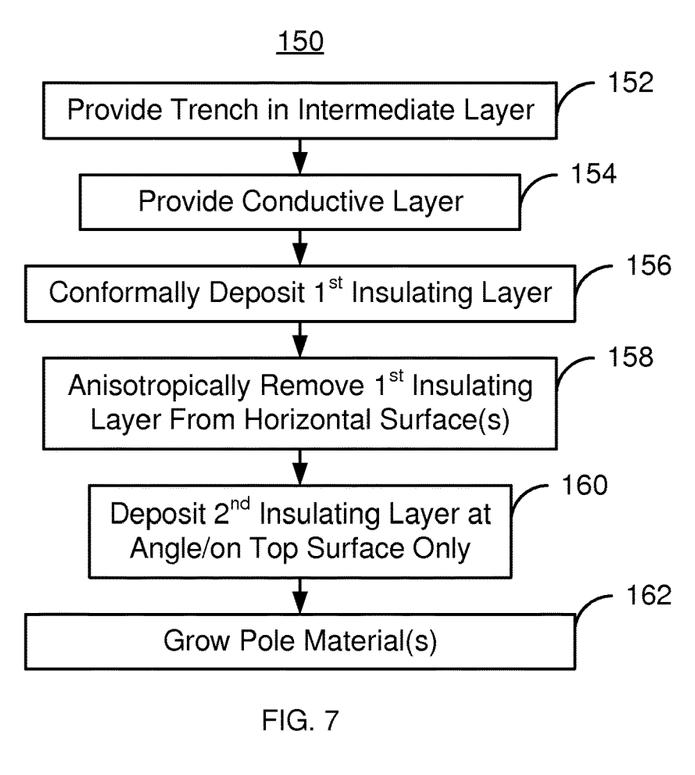
FIG. 7 depicts a flow chart of another exemplary embodiment of a method for providing a pole for a magnetic write apparatus.

FIG. 7 depicts an exemplary embodiment of a method 150 for providing a magnetic write apparatus 250 having a pole that is seam-free in at least the pole tip region. In some embodiments, the pole is also seam-free in the yoke region. For simplicity, some steps may be omitted, interleaved, and/or combined. FIGS. 8A-8C through 13A-13C depict an exemplary embodiment of a magnetic write apparatus 250 during fabrication using the method 150. The magnetic write apparatus 250 may be part of the disk drive 200. Alternatively, the magnetic write apparatus 250 may be part of another data storage device. For clarity, FIGS. 8A-8C through 13A-13C are not to scale. For simplicity not all portions of the magnetic write apparatus 250 are shown. In addition, although the magnetic write apparatus 250 is depicted in the context of particular components other and/or different components may be used. For example, circuitry used to drive and control various portions of the magnetic write apparatus 250 is not shown. For simplicity, only a particular number and type components may be shown. However, other numbers and types of components and/or and their sub-components, might be used. The magnetic write apparatus 250 may be a PMR write apparatus. However, in other embodiments, the magnetic write apparatus 250 may be configured for other types of magnetic recording. The method 150 is also described in the context of providing a single magnetic write apparatus 250. However, the method 150 may be used to fabricate multiple magnetic write apparatuses at substantially the same time. The method 150 may also be used to fabricate other magnetic write apparatuses. The method 150 is also described in the context of particular layers. A particular layer may include multiple materials and/or multiple sub-layers. The method 150 also may start after formation of other portions of the magnetic write apparatus. For example, the method 150 may start after a reader, return pole/shield, intermediate layer and/or other structure have been fabricated.

Figure 8A:
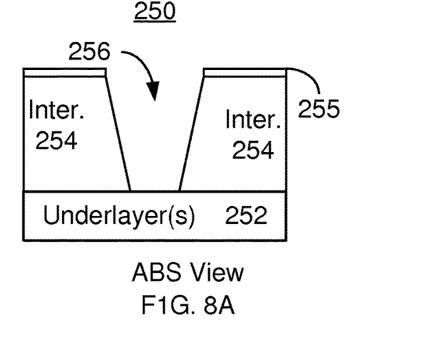
FIGS. 8A, 8B and 8C depict ABS, yoke and plan views of an exemplary embodiment of a magnetic write apparatus during fabrication.
Figure 8B:
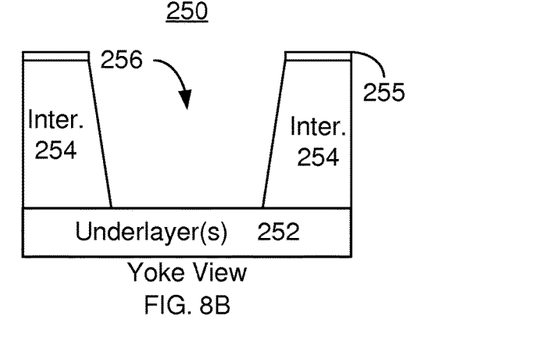
Figure 8C:
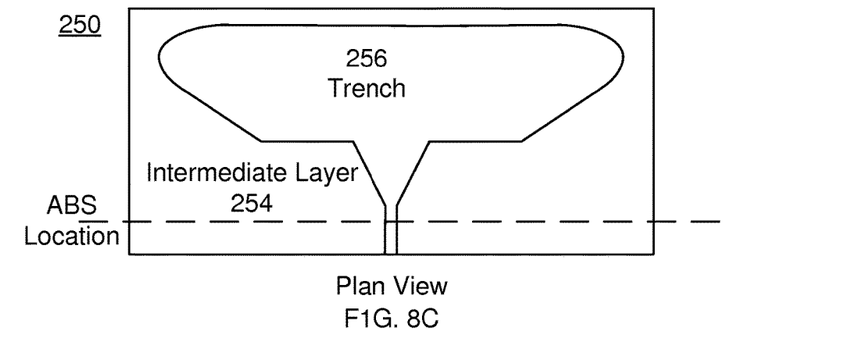

A trench is formed in the intermediate layer, via step 152. In some embodiments, the intermediate layer may be an insulator such as aluminum oxide. In some embodiments the trench is formed using a reactive ion etch. The trench may have the desired location and, for at least some portions, profile for pole to be fabricated. FIGS. 8A-8C depict ABS, yoke and plan views of the write apparatus 250 after step 152 has been performed. Thus, underlayer(s) 252 are shown. In some embodiments, the underlayer(s) 252 is formed of a single layer. However, in other embodiments, the underlayer(s) 252 may be multiple layers. The underlayer(s) 252 may also include a leading shield. Also shown is intermediate layer 254 in which a trench 256 has been formed. The trench 256 also corresponds to an aperture in the mask 255 that is labeled only in FIGS. 8A and 8B. The ABS location depicted in FIG. 8C corresponds to the surface which, after fabrication is completed, forms the ABS. For example, the write apparatus 250 may be lapped to the ABS location.

Once the trench has been formed, at least one conductive layer is provided, via step 154. In some embodiments, the conductive layer is a nonmagnetic seed layer, such as Ru. However, in other embodiments, other material(s) may be used. In some embodiments, the seed layer may be deposited over the entire trench and intermediate layer 254 in step 154. Stated differently, step 154 may involve a blanket deposition step over the device area. This deposition step may, but need not, be conformal. In some embodiments, a CVD Ru deposition may be carried out. However, other material(s) and/or deposition process(es) might be used.

Figure 9A:
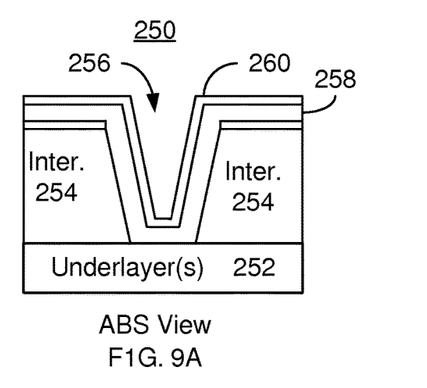
FIGS. 9A and 9B depict ABS and yoke views of an exemplary embodiment of a magnetic write apparatus during fabrication.
Figure 9B:
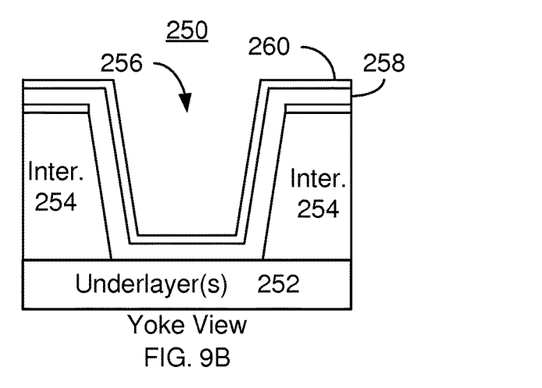

A first insulating layer is conformally deposited, via step 156. An ALD deposition of aluminum oxide may be performed in step 156. In other embodiments, the conformal deposition may take place using another technique and/or another material. The insulator(s) used for the first insulating layer may be desired to be reactive ion etchable. For example, silicon nitride and/or silicon oxide might also be used. FIGS. 9A and 9B depict ABS and yoke views of the magnetic write apparatus 250 after step 156 is performed. Thus, a conductive layer 268 has been formed in step 154. In addition, a conformal insulating layer 260 has also been provided. After step 156, the conductive layer 258 may be completely covered by the first insulating layer 260. The insulating layer 260 is thick enough to electrically insulate the underlying conductive layer 258. In some embodiments, the thickness of the insulating layer 260 is at least 1.5 nm. In some such embodiments, the insulating layer 260 is at least five nanometers thick and not more than ten nanometers thick. However, other thicknesses are possible.

Figure 10A:
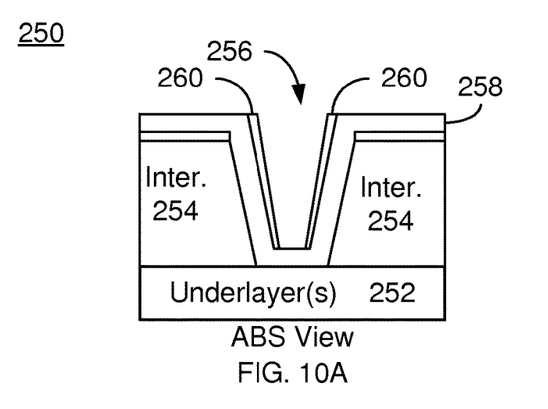
Figure 10B:
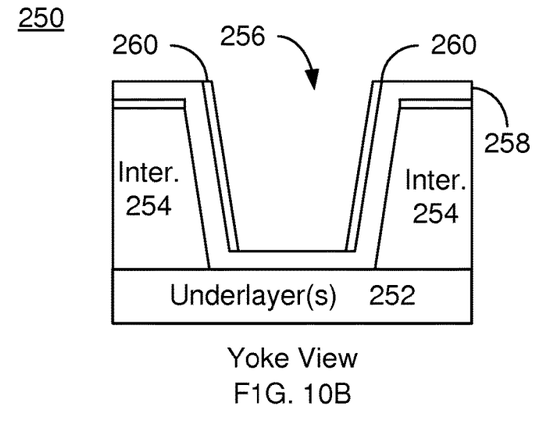
Figure 10C:
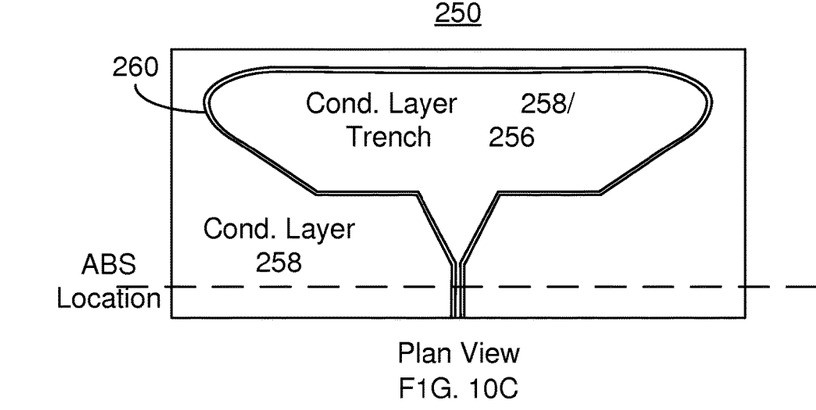

The first insulating layer 260 is anisotropically removed, via step 158. The insulating layer 260 is preferentially removed from horizontal surfaces, via step 158. Step 158 may thus include performing a RIE. The etch conditions may be configured such that the RIE is anisotropic, etching more of the insulating layer 260 in a vertical direction. FIGS. 10A-10C depict ABS, yoke and plan views of the write apparatus 250 after step 158 has been performed. Because the insulating layer 260 is anisotropically etched and because the insulating layer 260 was conformally deposited, the insulating layer 260 has been removed from horizontal surfaces. Thus, the insulating layer 260 is no longer present on the bottom of the trench 256 or on the top surface of the conductive layer 258. Because the insulating layer 260 on the sidewalls of the trench 256 is oriented substantially vertically, little to none of this portion of the insulating layer 260 has been removed.

Figure 11A:
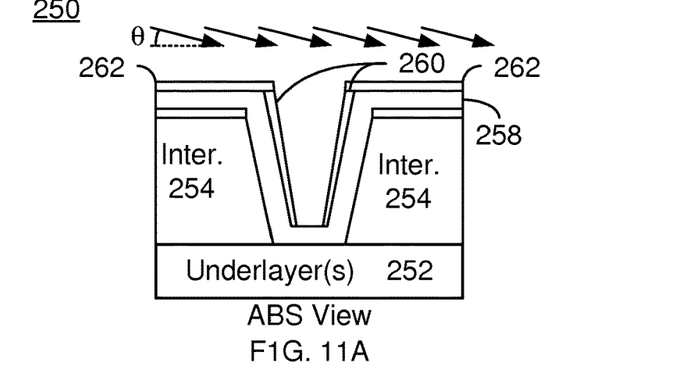
Figure 11B:
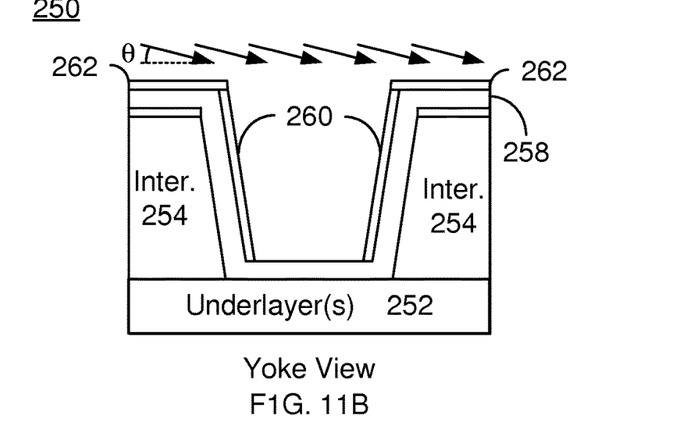
Figure 11C:
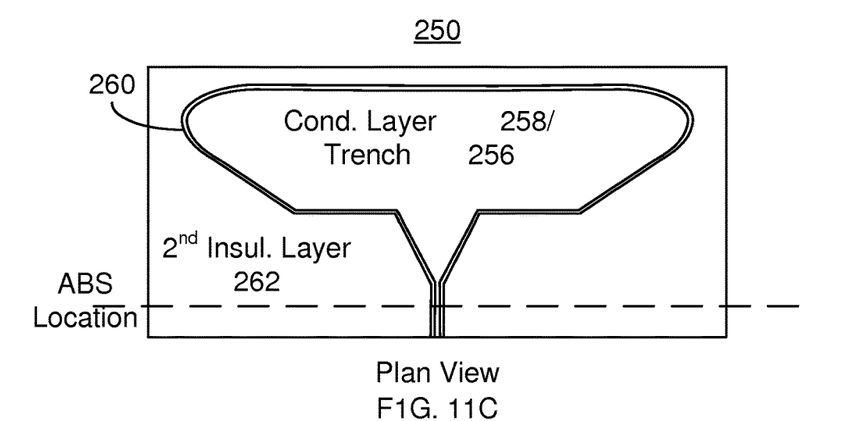

A second insulating layer is deposited on the top surface of the conductive layer 258, via step 160. Step 160 may include ion beam depositing the second insulating layer at a small (glancing) angle from the top surface of the conductive layer 258. In some embodiments, the angle may be greater than zero degrees and not more than five degrees. However, the angle may be configured based upon the geometry of the trench 256. The angle is selected to be sufficiently low that the insulating material being deposited does not land on and adhere to the bottom of the trench. FIGS. 11A-11C depict ABS, yoke and plan views of the write apparatus 250 while step 160 is performed. Thus, the ion beam deposition is at a deposition angle, θ, from the top surface of the conductive layer 258. As can be seen in FIGS. 11A-11B, this deposition angle is sufficiently small that material being deposited does not reach the bottom of the trench 256 (not labeled in FIGS. 11A-11B). The second insulating layer does 262 is shown. The second insulating layer 262 resides primarily or completely on the top surface of the conductive layer 258. Although not shown, a portion of the second insulating layer 262 might extend into the trench 256. However, because of the deposition method, the second insulating layer 262 does not cover the bottom of the trench. Thus, the conductive layer 258 remains exposed at the bottom of the trench, but not on the top surface of the intermediate layer 258 in at least the region around the pole being formed. The second insulating layer 262 may be made of the same material(s) as the first insulating layer. However, this is not required. Further, in some embodiments, the second insulating layer 262 need not be RIEable.

The material(s) for the pole being formed are grown, via step 162. In some embodiments, step 162 includes electroplating the pole materials. The materials provided in step 162 include high saturation magnetization material(s) such as CoFe. However, other materials including but not limited to nonmagnetic material(s) might be used. For example, the pole being formed may be a laminated pole including multiple layers. One or more of these layers might be nonmagnetic. In other embodiments, a single material is grown in step 162. Because the conductive layer 258 is only exposed at the bottom of the trench 256, the material(s) for the pole grow vertically, from the bottom of the trench/pole up.

Figure 12A:
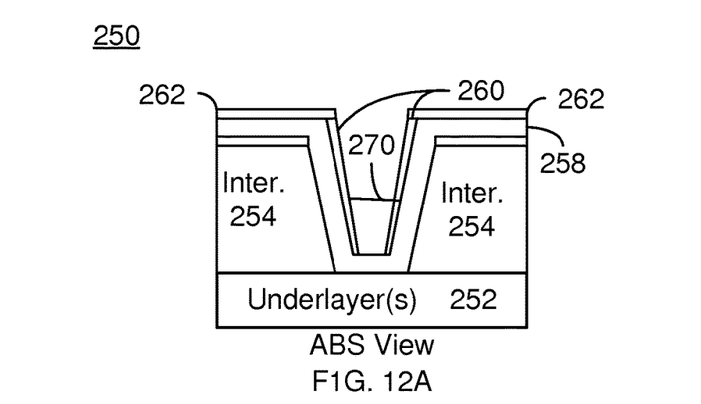
Figure 12B:
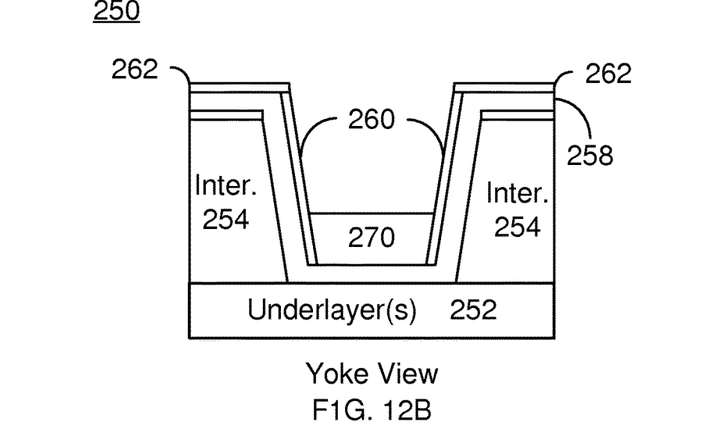
Figure 12C:
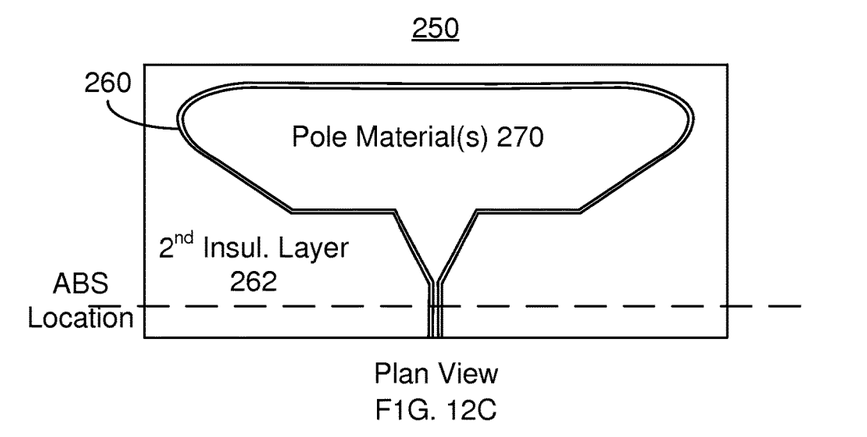
Figure 13A:
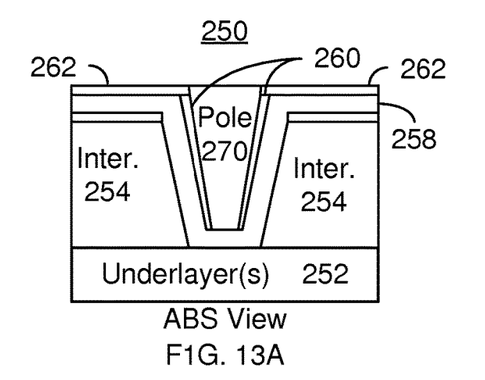
Figure 13B:
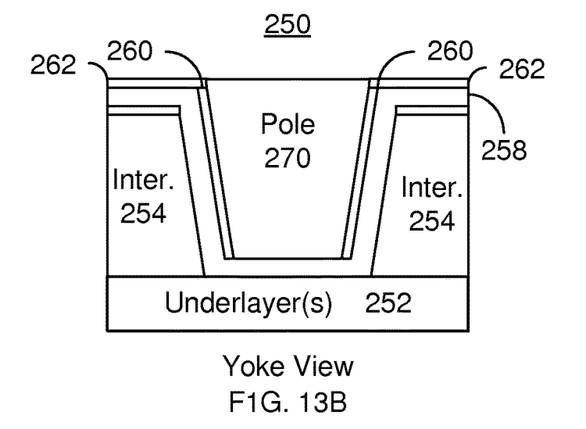
Figure 13C:
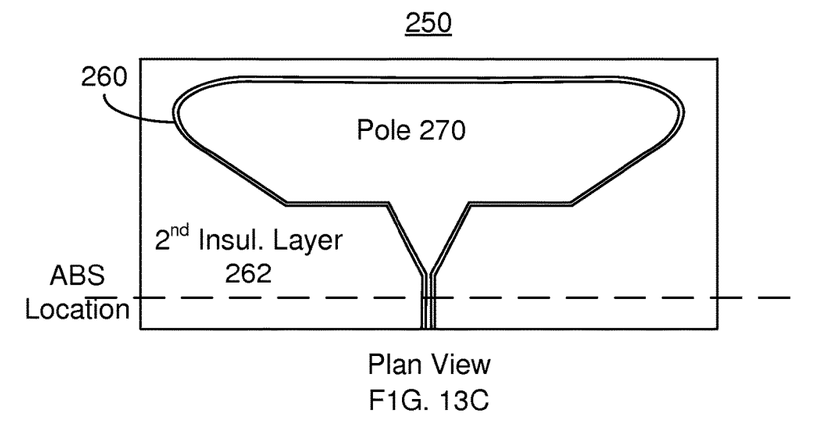

FIGS. 12A-12C depict ABS, yoke and plan views of the write apparatus 250 while step 162 is performed. Thus, the pole material(s) 270 have started to grow in the trench 256 (not labeled in FIGS. 12A-12C). In both the pole tip region shown in FIG. 12A and the yoke region shown in FIG. 12B, the pole material(s) grow from the bottom toward the top. FIGS. 13A-13C depict ABS, yoke and plan views of the write apparatus 250 after step 162 has been performed. In some embodiments, other steps such as a planarization may have been performed. Thus, the pole 270 has been grown and fills the trench 256. As can be seen in FIGS. 13A and 13B, the pole 270 may be seam-free in both the pole tip region and the yoke region.

Using the method 150, performance of the pole 270 and magnetic write apparatus 250 may be enhanced. The pole 270 may be substantially free of seams. Because of the pole materials may grow vertically from the bottom of the trench 256 up, in regions in which the pole 270 is grown, a seam is not formed. At least a portion of the pole 270, and in some embodiments all of the pole 270, may thus be seam free. Consequently, the pole formed using the method 150 may provide a higher magnetic field. Performance of the pole and magnetic write apparatus may thus be improved. This improvement may be particularly beneficial at higher recording densities where a seam might occupy a significant portion of the pole tip.

What is claimed is:

1. A method for fabricating a magnetic write apparatus comprising:
    forming a trench in an intermediate layer, the trench having a shape and location corresponding to a pole, the trench having a bottom, a top, and a plurality of sides;
    depositing a conductive layer on the bottom, the top, and plurality of sides of the trench and on a top surface of a remaining portion of the intermediate layer;
    depositing a first insulating layer over the conductive layer on the plurality of sides of the trench,
    depositing a second insulating layer over the conductive layer on the top surface of the remaining portion of the intermediate layer, with the conductive layer on the bottom of the trench being exposed, wherein the second insulating layer is deposited at a deposition angle of not more than ten degrees from the top surface of the remaining portion of the intermediate layer; and
    growing at least one pole material on the exposed conductive layer on the bottom of the trench to provide the pole.

2. The method of claim 1 wherein the step of growing the at least one pole material further includes:
    electroplating the at least one pole material.

3. The method of claim 1 wherein the at least one pole material grows from the bottom of the trench vertically toward the top of the trench.

4. The method of claim 1 wherein the step of depositing the first insulating layer comprises:
    conformally depositing the first insulating layer; and
    removing a portion of the first insulating layer on at least the bottom of the trench.

5. The method of claim 4 wherein the step of depositing the first insulating layer further includes:
    atomic layer depositing an aluminum oxide layer.

6. The method of claim 4 wherein the step of removing the portion of the first insulating layer removes an additional portion of the first insulating layer on the top surface of the remaining portion of the intermediate layer.

7. The method of claim 6 wherein the step of removing the portion of the first insulating layer further includes: anisotropically reactive ion etching the first insulating layer such that the portion of the first insulating layer on the bottom of the trench and the additional portion of the first insulating layer on the top surface of the remaining portion of the intermediate layer are removed.

8. The method of claim 1 wherein the first insulating layer includes at least one of aluminum oxide, silicon nitride and silicon oxide.

9. The method of claim 1 wherein the second insulating layer includes at least one of aluminum oxide, silicon nitride and silicon oxide.

10. The method of claim 1 wherein the step of depositing the second insulating layer further includes:
    ion beam depositing the second insulating layer at the angle of not more than ten degrees from the top surface.

11. The method of claim 10 wherein the second insulating layer is an aluminum oxide layer.

12. The method of claim 1 wherein the first insulating layer is at least 1.5 nanometers thick.

13. The method of claim 1 wherein the top of the trench is wider than the bottom of the trench in a pole tip region of the trench.

14. A method for fabricating magnetic transducer comprising:
    forming a trench in an intermediate layer, the trench having a shape and location corresponding to a pole, the trench having a bottom, a top and a plurality of sides;
    depositing a conductive layer in the trench and on a top surface of a remaining portion of the intermediate layer;
    depositing at least one insulating layer on the plurality of sides of the trench, the depositing of the at least one insulating layer comprising:
        atomic layer depositing a first insulating layer, the first insulating layer being conformal to the conductive layer;
        anisotropically reactive ion etching the first insulating layer to remove a portion of the first insulating layer, thereby exposing a first portion of the conductive layer on the bottom of the trench and a second portion of the conductive layer on the top surface; and
        ion beam depositing a second insulating layer at an angle of not more than ten degrees from the top surface such that the second insulating layer covers the second portion of the conductive layer, the first portion of the conductive layer remaining exposed;
    growing at least one pole material on the first portion of the conductive layer that is exposed to provide a pole by electroplating the at least one pole material from the bottom of the trench vertically such that the at least one pole material is seam-free; and
    providing at least one coil for energizing the pole.

15. A method comprising:
    forming a trench in an intermediate layer, the trench having a bottom surface and side surfaces;
    depositing a conductive layer on the side surfaces and the bottom surface of the trench, including depositing the conductive layer on a remaining top surface of the intermediate layer;
    depositing a first insulating layer over the conductive layer on the side surfaces of the trench, resulting in the first insulating layer extending on the conductive layer on the side surfaces of the trench leaving the conductive layer on the bottom surface of the trench exposed;
    depositing a second insulating layer different from the first insulating layer over the conductive layer on the remaining top surface of the intermediate layer after the step of depositing the first insulating layer such that the conductive layer on the bottom surface of the trench remains exposed; and
    growing a pole material on the exposed conductive material on the bottom surface of the trench for forming a pole of a magnetic write apparatus.

16. The method of claim 15, wherein a portion of the second insulating layer extends to the side surfaces of the trench.

17. The method of claim 15, wherein the first insulating layer does not extend to the remaining top surface of the intermediate layer.

18. The method of claim 15, wherein the second insulating layer does not extend to the side surfaces of the trench.

19. The method of claim 15, wherein the pole is seam free.

20. The method of claim 15, wherein the first insulating layer is formed of a first material and the second insulating layer is formed of a second material that is different from the first material.

* * * * *